United States Patent
Han et al.

(10) Patent No.: US 10,820,014 B2
(45) Date of Patent: Oct. 27, 2020

(54) COMPOUND MOTION-COMPENSATED PREDICTION

(71) Applicant: GOOGLE LLC, Mountain View, CA (US)

(72) Inventors: Jingning Han, Santa Clara, CA (US); Yaowu Xu, Saratoga, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/561,165

(22) Filed: Sep. 5, 2019

(65) Prior Publication Data

US 2020/0007890 A1  Jan. 2, 2020

Related U.S. Application Data

(63) Continuation of application No. 15/675,979, filed on Aug. 14, 2017, now Pat. No. 10,412,410.

(51) Int. Cl.
*H04N 19/573* (2014.01)
*H04N 19/52* (2014.01)
(Continued)

(52) U.S. Cl.
CPC ........... *H04N 19/573* (2014.11); *H04N 5/225* (2013.01); *H04N 19/107* (2014.11);
(Continued)

(58) Field of Classification Search
CPC ... H04N 19/573; H04N 19/126; H04N 19/107
See application file for complete search history.

(56) References Cited

U.S. PATENT DOCUMENTS

| | | | |
|---|---|---|---|
| 6,404,813 B1 * | 6/2002 | Haskell | H04N 19/56 |
| | | | 375/240.12 |
| 7,266,150 B2 * | 9/2007 | Demos | H04N 19/167 |
| | | | 375/240.15 |

(Continued)

FOREIGN PATENT DOCUMENTS

| | | | |
|---|---|---|---|
| EP | 1763253 A2 * | 3/2007 | ........... H04N 19/134 |
| EP | 1763253 A2 | 3/2007 | |
| EP | 2302933 A1 | 3/2011 | |

OTHER PUBLICATIONS

Bankoski, et al., "Technical Overview of VP8, an Open Source Video Codec for the Web", Jul. 11, 2011, 6 pp.

(Continued)

*Primary Examiner* — Dramos Kalapodas
(74) *Attorney, Agent, or Firm* — Young Basile Hanlon & MacFarlane, P.C.

(57) ABSTRACT

A prediction scheme is selected for encoding or decoding a video block. A first compound motion block can be determined by weighting distances from a first reference frame to the video frame and from a second reference frame to the video frame using one or more quantized weighting coefficients. A second compound motion block can be determined based on an average of pixel values a video block of the first reference frame and pixel values from a video block of the second reference frame. One of the first compound motion block or the second compound motion block is selected and used to generate a prediction block. Alternatively, data encoded to a bitstream including the video frame can be used to determine which compound motion block to use to generate the prediction block. The current block of the video frame is then encoded or decoded using the prediction block.

20 Claims, 9 Drawing Sheets

(51) Int. Cl.

| | |
|---|---|
| *H04N 19/107* | (2014.01) |
| *H04N 19/172* | (2014.01) |
| *H04N 19/176* | (2014.01) |
| *H04N 19/91* | (2014.01) |
| *H04N 19/82* | (2014.01) |
| *H04N 19/86* | (2014.01) |
| *H04N 19/61* | (2014.01) |
| *H04N 19/70* | (2014.01) |
| *H04N 19/126* | (2014.01) |
| *H04N 5/225* | (2006.01) |
| *H04N 19/567* | (2014.01) |
| *H04N 19/577* | (2014.01) |

(52) U.S. Cl.
CPC ......... *H04N 19/126* (2014.11); *H04N 19/172* (2014.11); *H04N 19/176* (2014.11); *H04N 19/52* (2014.11); *H04N 19/567* (2014.11); *H04N 19/577* (2014.11); *H04N 19/61* (2014.11); *H04N 19/70* (2014.11); *H04N 19/82* (2014.11); *H04N 19/86* (2014.11); *H04N 19/91* (2014.11)

(56) References Cited

U.S. PATENT DOCUMENTS

| | | | | |
|---|---|---|---|---|
| 8,351,503 | B2* | 1/2013 | Jeon | H04N 19/513 375/240.15 |
| 9,288,501 | B2* | 3/2016 | Zheng | H04N 19/159 |
| 9,531,990 | B1* | 12/2016 | Wilkins | H04N 19/176 |
| 2009/0323806 | A1* | 12/2009 | Chujoh | H04N 19/107 375/240.12 |
| 2010/0290532 | A1* | 11/2010 | Yamamoto | H04N 19/117 375/240.16 |
| 2013/0259122 | A1* | 10/2013 | Sugio | H04N 13/00 375/240.08 |
| 2015/0195572 | A1* | 7/2015 | Chen | H04N 19/70 375/240.16 |
| 2017/0111652 | A1* | 4/2017 | Davies | H04N 19/189 |

OTHER PUBLICATIONS

Bankoski et al., "VP8 Data Format and Decoding Guide", Independent Submission RFC 6389, Nov. 2011, 305 pp.

Bankoski et al., "VP8 Data Format and Decoding Guide draft-bankoski-vp8-bitstream-02", Network Working Group, Internet-Draft, May 18, 2011, 288 pp.

Series H: Audiovisual and Multimedia Systems, Coding of moving video: Implementors Guide for H.264: Advanced video coding for generic audiovisual services, International Telecommunication Union, Jul. 30, 2010, 15 pp.

"Introduction to Video Coding Part 1: Transform Coding", Mozilla, Mar. 2012, 171 pp.

"Overview VP7 Data Format and Decoder", Version 1.5, On2 Technologies, Inc., Mar. 28, 2005, 65 pp.

Series H: Audiovisual and Multimedia Systems, Infrastructure of audiovisual services—Coding of moving video, Advanced video coding for generic audiovisual services, International Telecommunication Union, Version 11, Mar. 2009. 670 pp.

Series H: Audiovisual and Multimedia Systems, Infrastructure of audiovisual services—Coding of moving video, Advanced video coding for generic audiovisual services, International Telecommunication Union, Version 12, Mar. 2010, 676 pp.

Series H: Audiovisual and Multimedia Systems, Infrastructure of audiovisual services—Coding of moving video, Amendment 2: New profiles for professional applications, International Telecommunication Union, Apr. 2007, 75 pp.

Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.

Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.

Series H: Audiovisual and Multimedia Systems, Infrastructure of audiovisual services—Coding of moving video, Advanced video coding for generic audiovisual services, Version 1, International Telecommunication Union, May 2003, 282 pp.

Series H: Audiovisual and Multimedia Systems, Infrastructure of audiovisual services—Coding of moving video, Advanced video coding for generic audiovisual services, Version 3, International Telecommunication Union, Mar. 2005, 343 pp.

"VP6 Bitstream and Decoder Specification", Version 1.02, On2 Technologies, Inc., Aug. 17, 2006, 88 pp.

"VP6 Bitstream and Decoder Specification", Version 1.03, On2 Technologies, Inc., Oct. 29, 2007, 95 pp.

"VP8 Data Format and Decoding Guide, WebM Project", Google On2, Dec. 1, 2010, 103 pp.

International Search Report and Written Opinion in PCT/US2018/030347, dated Jul. 13, 2018, 14 pgs.

* cited by examiner

COMPOUND MOTION-COMPENSATED PREDICTION

CROSS REFERENCE TO RELATED APPLICATION(S)

This disclosure is a continuation of U.S. patent application Ser. No. 15/675,979, filed Aug. 14, 2017, the disclosure of which is hereby incorporated by reference in its entirety.

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including encoding or decoding techniques.

SUMMARY

An apparatus for decoding an encoded block of an encoded video frame according to an implementation of this disclosure comprises a memory and a processor configured to execute instructions stored in the memory. The instructions include instructions to decode one or more syntax elements indicating how to perform prediction for the encoded block from an encoded bitstream including the encoded video frame and determine whether the one or more syntax elements indicate to perform the prediction for the encoded block using a weighted distance approach. Responsive to a determination that the one or more syntax elements indicate to perform the prediction for the encoded block using the weighted distance approach, a first weight is applied to video data of a first reference frame that is a first distance from the encoded video frame to determine a first value, a second weight is applied to video data of a second reference frame that is a second distance from the encoded video frame to determine a second value, a first compound motion block is formed based on the first weight and the second weight, and the encoded block is decoded using the first compound motion block. Responsive to a determination that the one or more syntax elements do not indicate to perform the prediction for the encoded block using the weighted distance approach, a second compound motion block is formed based on an average of the video data of the first reference frame and the video data of the second reference frame, and the encoded block is decoded using the second compound motion block.

A method for decoding an encoded block of an encoded video frame according to an implementation of this disclosure comprises comparing a first distance from a first reference frame to the encoded video frame against a second distance from a second reference frame to the encoded video frame to determine a ratio of the first distance and the second distance. A pair of quantized weighting coefficients are identified based on the ratio of the first distance and the second distance. A compound motion block is formed using the pair of quantized weighting coefficients. The encoded block is decoded using the compound motion block.

An method for decoding an encoded block of an encoded video frame according to another implementation of this disclosure comprises forming a compound motion block based on a first value and a second value and decoding the encoded block using the compound motion block. The first value is determined by applying a first weight to video data of a first reference frame. The second value is determined by applying a second weight to video data of a second reference frame. The first weight is determined based on a first distance from the first reference frame to the encoded video frame. The second weight is determined based on a second distance from the second reference frame to the encoded video frame.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings described below, wherein like reference numerals refer to like parts throughout the several views.

DETAILED DESCRIPTION

Video compression schemes may include breaking respective images, or video frames, into smaller portions, such as video blocks, and generating an encoded bitstream using techniques to limit the information included for respective video blocks thereof. The encoded bitstream can be decoded to re-create the source images from the limited information. In some cases, compound motion prediction may be used to predict motion within a current video block by combining motion information for two or more reference frames.

For example, when two reference frames are used, a pixel values from a block of each of those reference frames may be identified and averaged to determine a compound motion block to use to predict motion of the current video block. However, this averaging-based prediction scheme may not always result in the best performance for encoding or decoding the video sequence. For example, the reference frames may not be equidistant from the video frame including the current video block. As a result, the averaging-based prediction scheme may not accurately reflect motion changes in the video sequence.

Implementations of this disclosure include encoding or decoding a video block of a video frame by selecting an optimal compound motion prediction scheme. A first compound motion block can be determined by weighting distances from a first reference frame to the video frame and from a second reference frame to the video frame using one or more quantized weighting coefficients. A second compound motion block can be determined based on an average of pixel values from a video block of the first reference frame and pixel values from a video block of the second reference frame. One of the first compound motion block or the second compound motion block is selected and used to generate a prediction block. Alternatively, data encoded to a bitstream including the video frame can be used to determine which compound motion block to use to generate the prediction block. The video block of the video frame is then encoded or decoded using the prediction block.

For example, during an encoding operation, an encoder can select one of a distance-based prediction scheme (e.g., the first compound motion block) or an averaging-based prediction scheme (e.g., the second compound motion block), such as based on rate-distortion values therefor, and encode data indicating the selection to a bitstream to which the video block is encoded. During a decoding operation, a decoder can decode the encoded data from the bitstream to determine which of the distance-based prediction scheme or averaging-based prediction scheme to select for decoding the encoded block. As used herein, a compound motion block may refer to a group of pixel values determined or otherwise calculated based on a combination of two or more other groups of pixel values.

Figure 1:
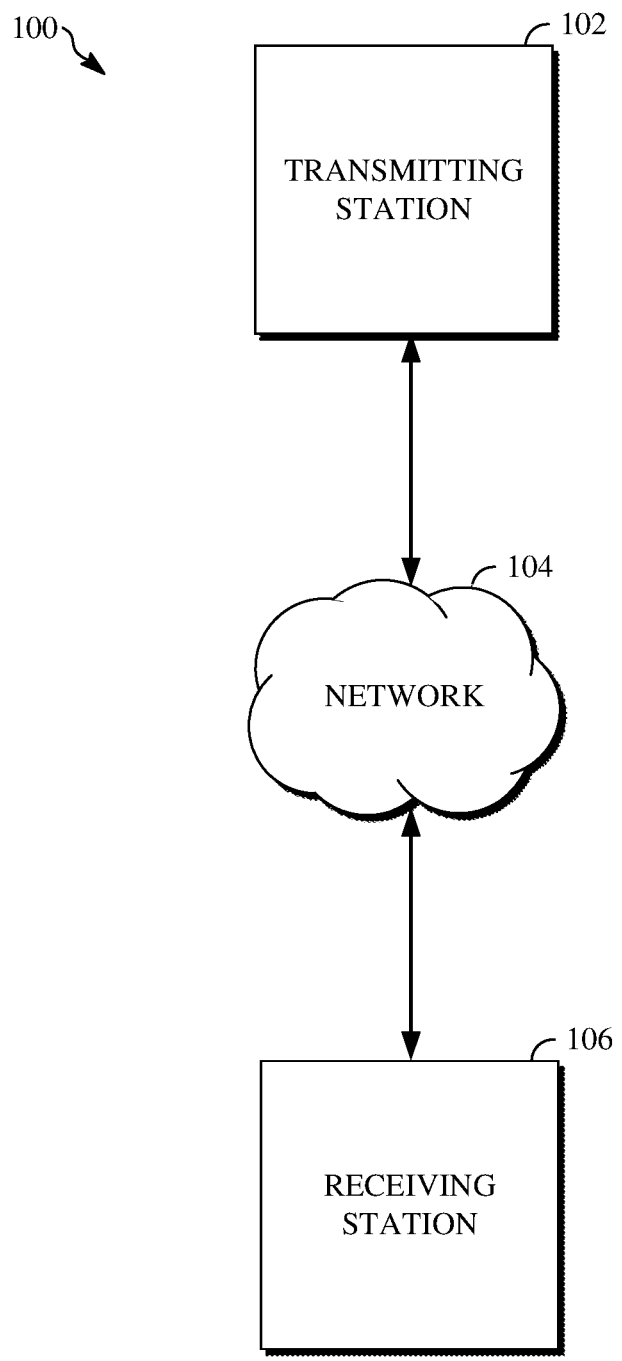
FIG. 1 is a schematic of a video encoding and decoding system.

Further details of techniques for video coding using frame rotation are described herein with initial reference to a system in which they can be implemented. FIG. 1 is a schematic of a video encoding and decoding system 100. A transmitting station 102 can be, for example, a computer having an internal configuration of hardware such as that described in FIG. 2. However, other implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102, and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
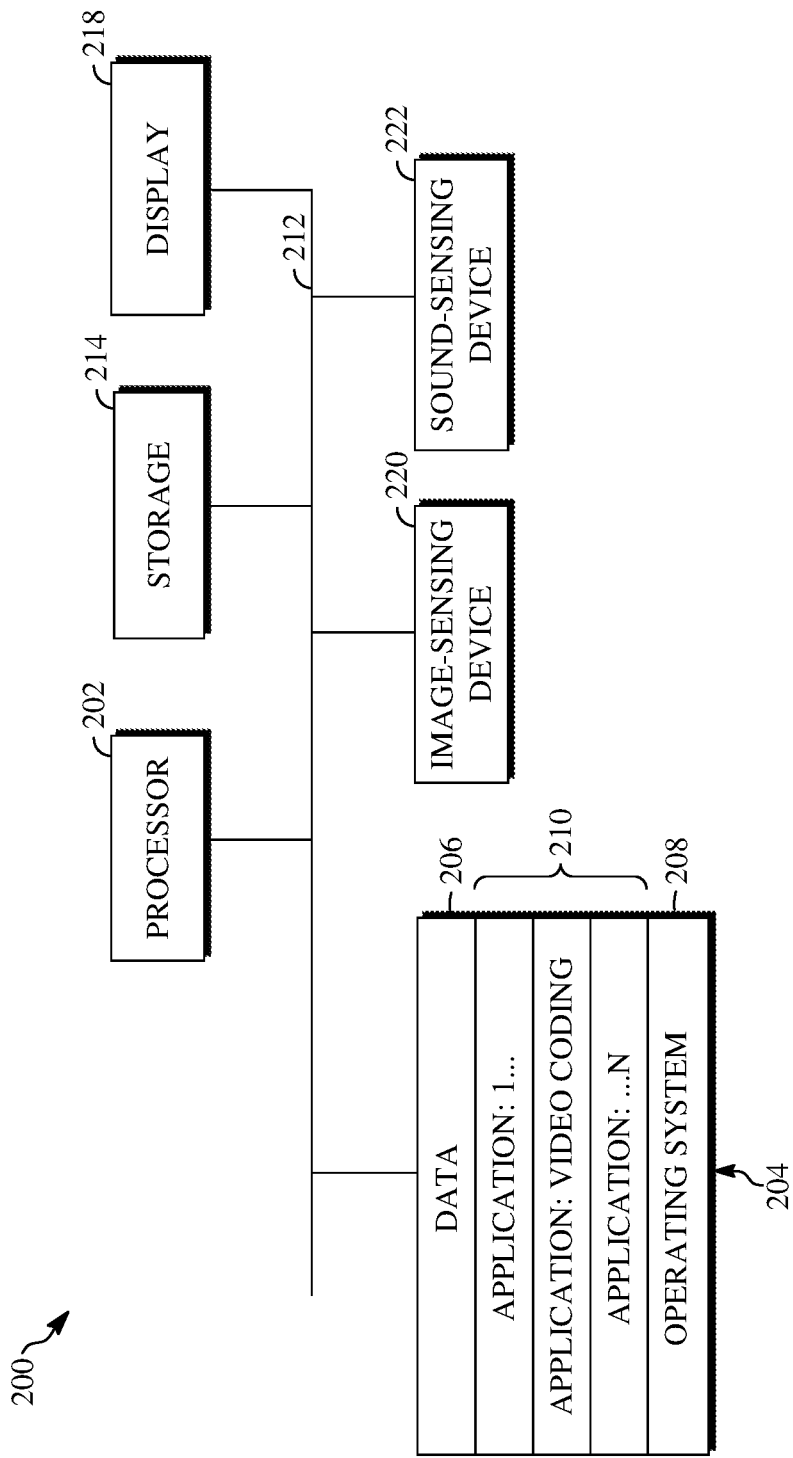
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used (e.g., a Hypertext Transfer Protocol-based (HTTP-based) video streaming protocol).

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits his or her own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A processor 202 in the computing device 200 can be a conventional central processing unit. Alternatively, the processor 202 can be another type of device, or multiple devices, capable of manipulating or processing information now existing or hereafter developed. For example, although the disclosed implementations can be practiced with one processor as shown (e.g., the processor 202), advantages in speed and efficiency can be achieved by using more than one processor.

A memory 204 in computing device 200 can be a read only memory (ROM) device or a random access memory (RAM) device in an implementation. However, other suitable types of storage device can be used as the memory 204. The memory 204 can include code and data 206 that is accessed by the processor 202 using a bus 212. The memory 204 can further include an operating system 208 and application programs 210, the application programs 210 including at least one program that permits the processor 202 to perform the techniques described herein. For example, the application programs 210 can include applications 1 through N, which further include a video coding application that performs the techniques described herein. The computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the processor 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display, or a light emitting diode (LED) display, such as an organic LED (OLED) display.

The computing device 200 can also include or be in communication with an image-sensing device 220, for example, a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the processor 202 and the memory 204 of the computing device 200 as being integrated into one unit, other configurations can be utilized. The operations of the processor 202 can be distributed across multiple machines (wherein individual machines can have one or more processors) that can be coupled directly or across a local area or other network. The memory 204 can be distributed across multiple machines such as a network-based memory or memory in multiple machines performing the operations of the computing device 200. Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
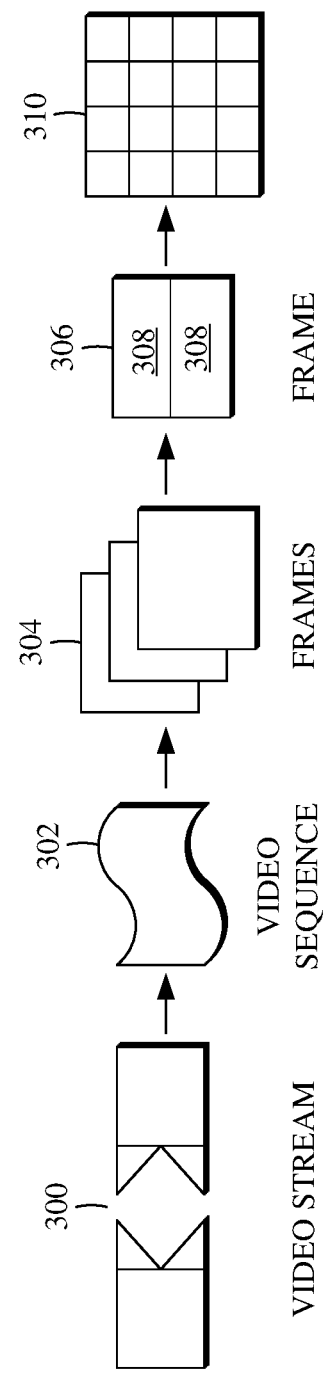
FIG. 3 is a diagram of a typical video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, for example, a frame 306. At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 4:
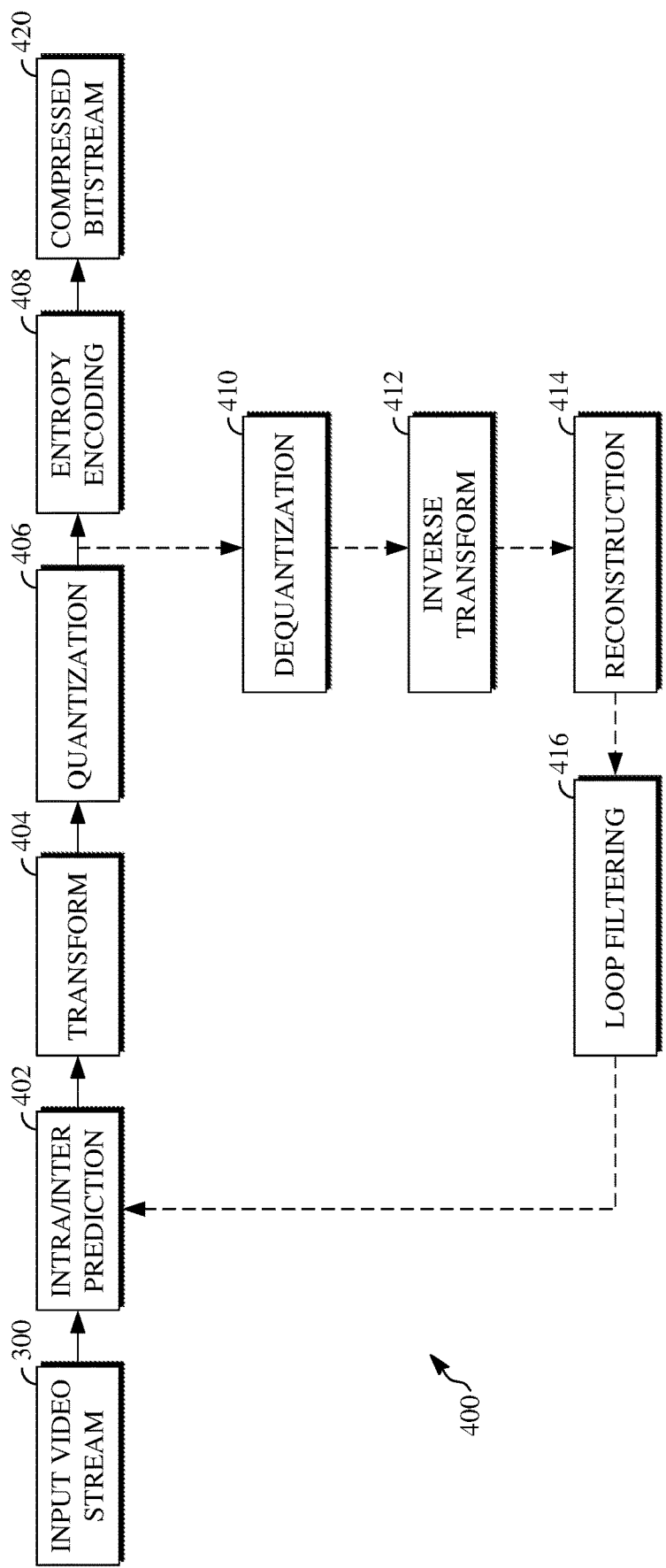
FIG. 4 is a block diagram of an encoder according to implementations of this disclosure.

FIG. 4 is a block diagram of an encoder 400 according to implementations of this disclosure. The encoder 400 can be implemented, as described above, in the transmitting station 102, such as by providing a computer software program stored in memory, for example, the memory 204. The computer software program can include machine instructions that, when executed by a processor such as the processor 202, cause the transmitting station 102 to encode video data in the manner described in FIG. 4. The encoder 400 can also be implemented as specialized hardware included in, for example, the transmitting station 102. In one particularly desirable implementation, the encoder 400 is a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, respective adjacent frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames.

Next, the prediction block can be subtracted from the current block at the intra/inter prediction stage 402 to produce a residual block (also called a residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated.

The quantized transform coefficients are then entropy encoded by the entropy encoding stage 408. The entropy-encoded coefficients, together with other information used to decode the block (which may include, for example, syntax elements such as used to indicate the type of prediction used, transform type, motion vectors, a quantizer value, or the like), are then output to the compressed bitstream 420. The compressed bitstream 420 can be formatted using various techniques, such as variable length coding (VLC) or arithmetic coding. The compressed bitstream 420 can also be referred to as an encoded video stream or encoded video bitstream, and the terms will be used interchangeably herein.

The reconstruction path (shown by the dotted connection lines) can be used to ensure that the encoder 400 and a decoder 500 (described below with respect to FIG. 5) use the same reference frames to decode the compressed bitstream 420. The reconstruction path performs functions that are similar to functions that take place during the decoding process (described below with respect to FIG. 5), including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. In some implementations, a non-transform based encoder can quantize the residual signal directly without the transform stage 404 for certain blocks or frames. In some implementations, an encoder can have the quantization stage 406 and the dequantization stage 410 combined in a common stage.

Figure 5:
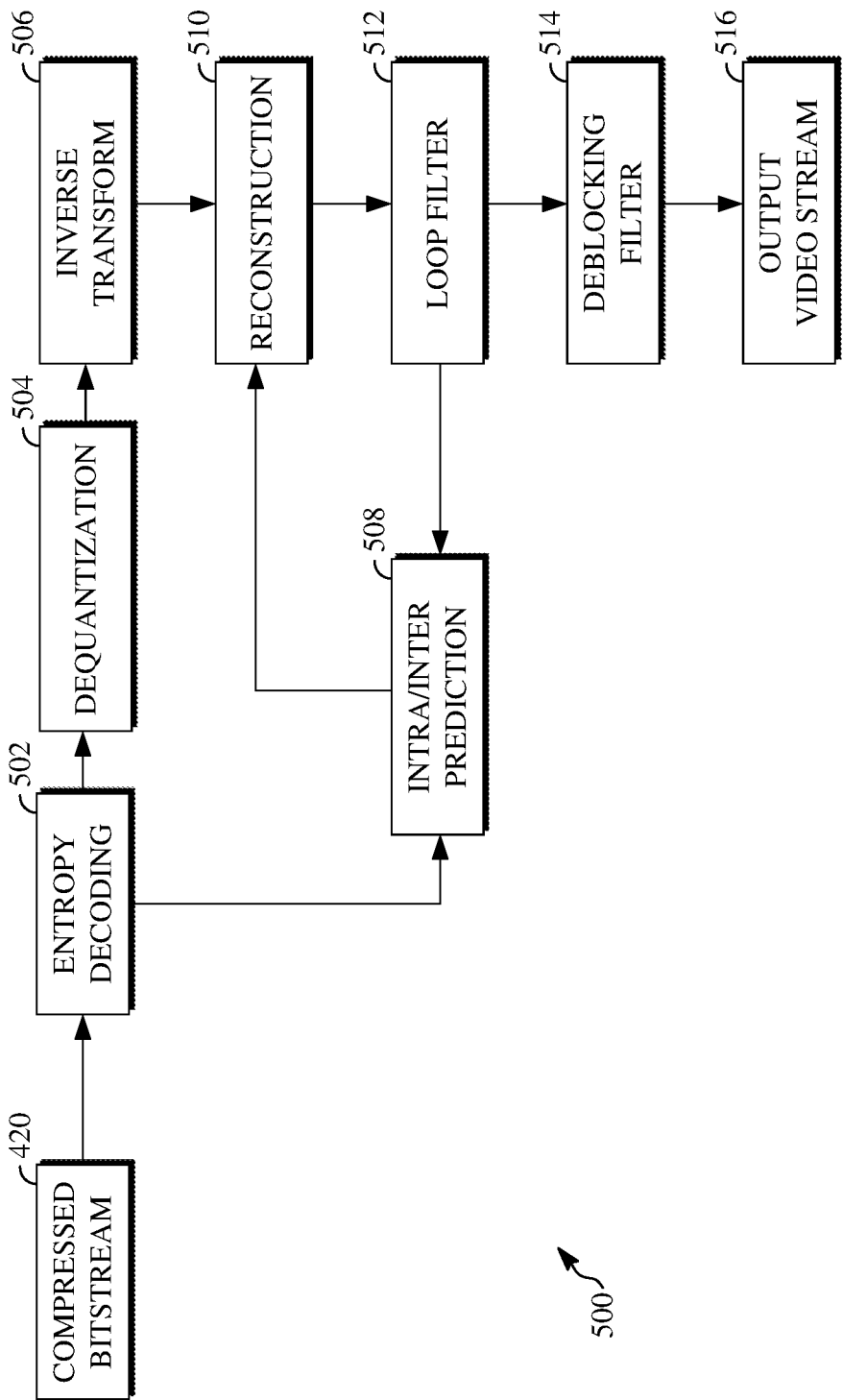
FIG. 5 is a block diagram of a decoder according to implementations of this disclosure.

FIG. 5 is a block diagram of a decoder 500 according to implementations of this disclosure. The decoder 500 can be implemented in the receiving station 106, for example, by providing a computer software program stored in the memory 204. The computer software program can include machine instructions that, when executed by a processor such as the processor 202, cause the receiving station 106 to decode video data in the manner described in FIG. 5. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512, and a deblocking filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400 (e.g., at the intra/inter prediction stage 402).

At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In this example, the deblocking filtering stage 514 is applied to the reconstructed block to reduce blocking distortion, and the result is output as the output video stream 516. The output video stream 516 can also be referred to as a decoded video stream, and the terms will be used interchangeably herein. Other variations of the decoder 500 can be used to decode the compressed bitstream 420. In some implementations, the decoder 500 can produce the output video stream 516 without the deblocking filtering stage 514.

Figure 6:
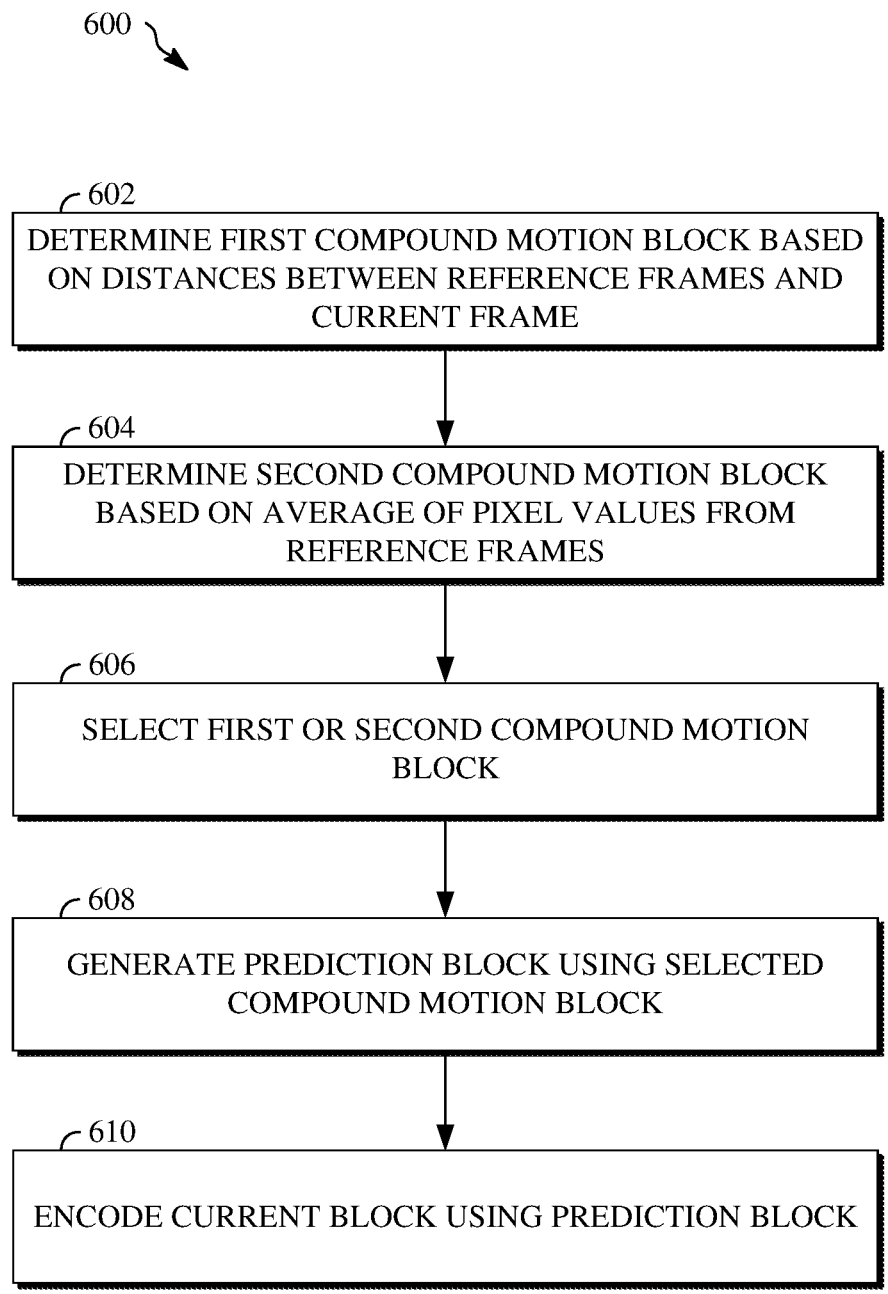
FIG. 6 is a flowchart diagram of an example of a technique for encoding a video block using a selected prediction scheme.
Figure 7:
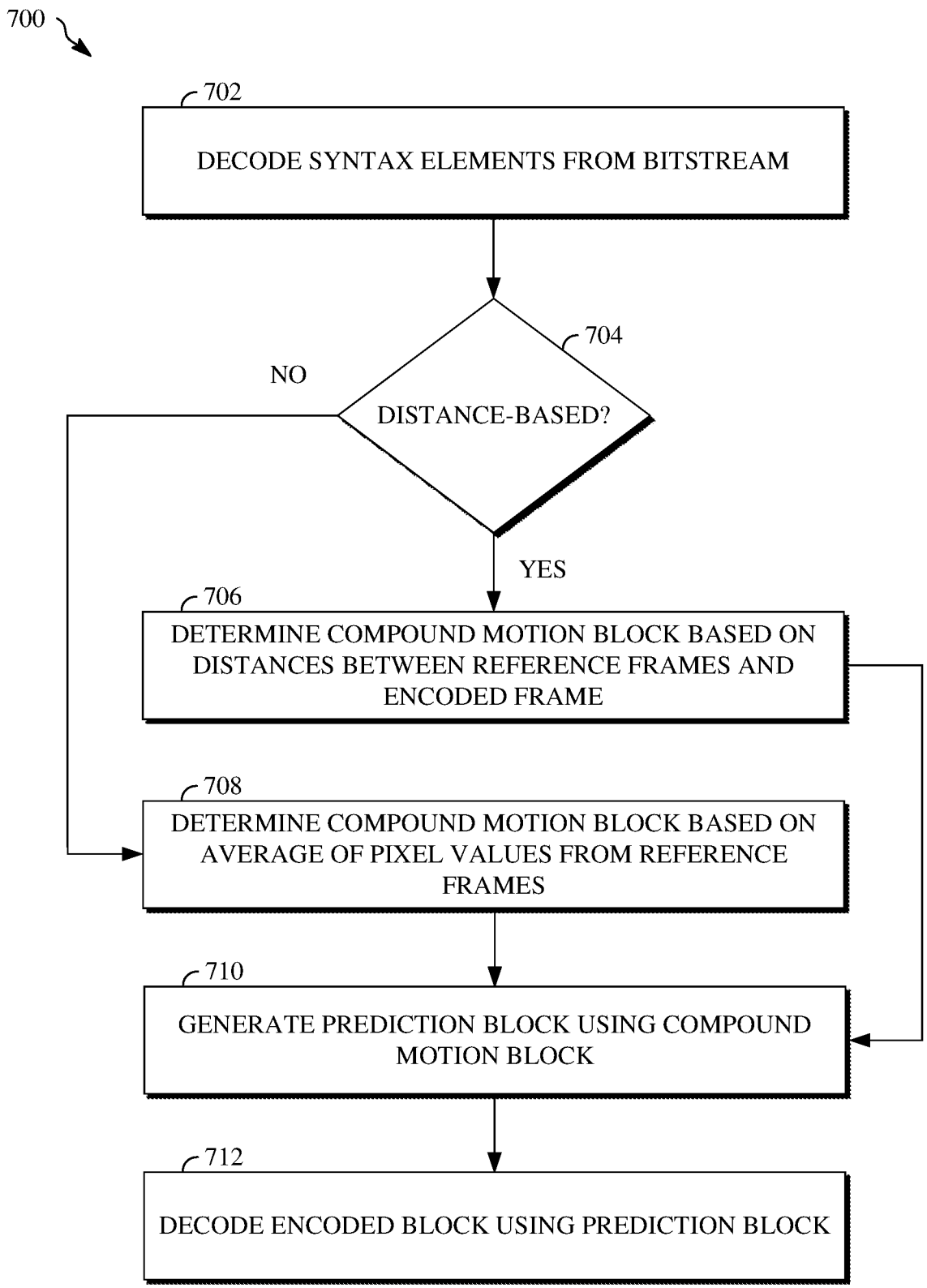
FIG. 7 is a flowchart diagram of an example of a technique for decoding an encoded block using a selected prediction scheme.

Techniques for encoding or decoding video blocks are now described with respect to FIGS. 6 and 7. FIG. 6 is a flowchart diagram of an example of a technique 600 for encoding a video block using a selected prediction scheme. FIG. 7 is a flowchart diagram of an example of a technique 700 for decoding an encoded block using a selected prediction scheme. One or both of the technique 600 or the technique 700 can be implemented, for example, as a software program that may be executed by computing devices such as the transmitting station 102 or the receiving station 106. For example, the software program can include machine-readable instructions that may be stored in a memory such as the memory 204 or the secondary storage 214, and that, when executed by a processor, such as the processor 202, may cause the computing device to perform the technique 600 and/or the technique 700. One or both of the technique 600 or the technique 700 can be implemented using specialized hardware or firmware. As explained above, some computing devices may have multiple memories or processors, and the operations described in one or both of the technique 600 or the technique 700 can be distributed using multiple processors, memories, or both.

For simplicity of explanation, the technique 600 and the technique 700 are each depicted and described as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 6, a flowchart diagram of a technique 600 for encoding a video block using a selected prediction scheme is shown. At 602, a first compound motion block is determined by weighting distances from a first reference frame to the video frame and from a second reference frame to the video frame using one or more quantized weighting coefficients. The first reference frame and the second reference frame may be past frames (e.g., frames that appear before the current video frame in a display order) or future frames (e.g., frames that appear after the current video frame in the display order). For example, the first reference frame can be a past frame and the second reference frame can be a future frame. In another example, the first reference frame and the second reference frame can both be past frames. In yet another example, the first reference frame and the second reference frame can both be future frames.

Determining the first compound motion block can include determining a first quantized weighting coefficient and a second quantized weighting coefficient by comparing a first distance from the first reference frame to the video frame to a second distance from the second reference frame to the video frame. The compared values of the first distance and the second distance may, for example, be absolute values of the first distance and the second distance. The first quantized weighting coefficient and the second quantized weighting coefficient are quantized based on the comparing and the first compound motion block is determined using the first quantized weighting coefficient and the second quantized weighting coefficient. For example, as described below with respect to FIG. 9, each of the first quantized weighting coefficient and the second quantized weighting coefficient may be a value of 1, 2, 3, or 4. In another example, the first quantized weighting coefficient and the second quantized weighting coefficient may be other values that demonstrate a relationship between the first distance and the second distance.

Determining the first quantized weighting coefficient and the second quantized weighting coefficient by comparing the first distance to the second distance can include determining whether the first distance is greater than or less than the second distance. Responsive to determining that the first distance is greater than the second distance, the first quantized weighting coefficient may be determined to have a value of 1 and the second quantized weighting coefficient has a value of at least 1. Responsive to determining that the first distance is less than the second distance, the first quantized weighting coefficient may be determined to have a value of at least 1 and the second quantized weighting coefficient has a value of 1.

The first compound motion block may, for example, be determined as CMB=((Ref1_MB*a))+(Ref2_MB*b))/(a+b), where Ref1_MB is a block of pixel values of the first reference frame usable to predict motion within the current video block, Ref2_MB is a block of pixel values of the second reference frame usable to predict motion within the current video block, a is the value determined by applying the first quantized weighting coefficient to the distance between the first reference frame and the current video frame, and b is the value determined by applying the second quantized weighting coefficient to the distance between the second reference frame and the current video frame.

That is, a first value can be determined by applying the first quantized weighting coefficient against pixel values from a video block of the first reference frame. A second value can be determined by applying the second quantized weighting coefficient against pixel values from a video block of the second reference frame. The first compound motion block may then be determined by dividing a sum of the first value and the second value by a sum of the first quantized weighting coefficient and the second quantized weighting coefficient.

At 604, a second compound motion block is determined based on an average of pixel values from a video block of the first reference frame and pixel values from a video block of the second reference frame. For example, determining an average of pixel values from a video block of the first reference frame and pixel values from a video block of the second reference frame can include summing pixel values in corresponding positions of the two video blocks and then dividing those summed pixel values by two. In another example, determining the average of pixel values from a video block of the first reference frame and pixel values from a video block of the second reference frame can include weighting all or a portion of the pixel values from the video block of the first reference frame or the second reference frame before determining the average thereof.

At 606, one of the first compound motion block or the compound motion block is selected. Selecting the one of the first compound motion block or the second compound motion block includes determining rate-distortion values resulting from predicting motion of the current block using each of the first compound motion block and the second compound motion block. Those rate-distortion values may be determined by performing a rate-distortion analysis based on the first compound motion block and the second compound motion block. For example, a first rate-distortion value can be determined for the first compound motion block and a second rate-distortion value can be determined for the second compound motion block. The one of the first compound motion block or the second compound motion block resulting in a lower one of the rate-distortion values is then selected. For example, performing the rate-distortion analysis can include comparing the first rate-distortion value and the second rate-distortion value.

A rate-distortion value refers to a ratio that balances an amount of distortion (e.g., a loss in video quality) with rate (e.g., a number of bits) for coding a block or other video component. As such, the prediction scheme that minimizes the rate-distortion value to encode the video block is selected for encoding the current block. For example, when the rate-distortion value for the first compound motion block (e.g., the distance-based prediction scheme) is higher than the rate-distortion value for the second compound motion block (e.g., the averaging-based prediction scheme), it may reflect that the motion between the reference frames and the current video frame is relatively low. However, when the rate-distortion value for the first compound motion block is lower than the rate-distortion value for the second compound motion block, it may reflect that the motion between the reference frames and the current video frame is relatively high.

At 608, a prediction block is generated using the selected one of the first compound motion block or the second compound motion block. The prediction block can include pixel values indicating a prediction of the motion of the current block according to the selected one of the first compound motion block or the second compound motion block. Generating the prediction block can include generating a prediction residual based on a difference between the current block and the prediction block. For example, the prediction residual can be generated using operations performed by the encoder 400 shown in FIG. 4 (e.g., at the intra/inter prediction stage 402). At 610, the current block is encoded using the prediction block. For example, encoding the current block using the prediction block can include transforming, quantizing, and entropy encoding the prediction residual to an encoded bitstream (e.g., the compressed bitstream 420 shown in FIG. 4).

In some implementations, the technique 600 includes encoding one or more syntax elements indicative of the selection of the first compound motion block or the second compound motion block to a bitstream to which the current block is encoded. For example, For example, the one or more syntax elements may include a bit. The value of the bit can indicate the prediction scheme associated with the motion vector used to encode the current block. For example, when the first compound motion block, and therefore the distance-based prediction scheme, is used, the value of the bit may be zero. When the second compound motion block, and therefore the averaging-based prediction scheme, is used, the value of then bit may be one. The one or more syntax elements may be encoded to a frame header of the video frame including the current block that was encoded.

In some implementations, the technique 600 can include using more than two reference frames. For example, when three reference frames are used, the first compound motion block can be determined by weighting the distance between a first one of the reference frames and the current video frame using a first quantized weighting coefficient, weighting the distance between a second one of the reference frames and the current video frame using a second quantized weighting coefficient, and weighting the distance between a third one of the reference frames and the current video frame using a third quantized weighting coefficient.

The compound motion block to use for predicting motion in the current video block using these three reference frames may, for example, be determined as CMB=((Ref1_MB*(1/ a))+(Ref2_MB*(1/b))+(Ref3_MB*(1/c)))/((1/a)+(1/b)+(1/c)), where Ref1_MB is a block of pixel values of the first reference frame usable to predict motion in the current video block, Ref2_MB is a block of pixel values of the second reference frame usable to predict motion in the current video block, Ref3_MB is a block of pixel values of third reference frame usable to predict motion in the current video block, a is the value determined by applying the first quantized weighting coefficient to the distance between the first reference frame and the current video frame, b is the value determined by applying the second quantized weighting coefficient to the distance between the second reference frame and the current video frame, and c is the value determined by applying the third quantized weighting coefficient to the distance between the third reference frame and the current video frame.

In some implementations, the technique 600 can include updating a probability model associated with the video frame to indicate whether a distance-based prediction scheme (e.g., the first compound motion block) or an averaging-based prediction scheme (e.g., the second compound motion block) was selected for predicting motion of the current block. For example, a context for the prediction scheme of the current block can be determined based on contexts of one or more of an above neighbor block of the current block or a left neighbor block of the current block, which contexts indicate the prediction scheme selected for encoding those neighbor blocks. The context for a given block of the video frame can have a first value indicating that a distance-based prediction scheme was used or a second value indicating that an averaging-based prediction scheme was used. The probability model can be updated to reflect probabilities of each of those prediction schemes being used.

Referring next to FIG. 7, a technique 700 for decoding an encoded block using a selected prediction scheme is shown. At 702, one or more syntax elements are decoded from a bitstream including an encoded video frame, which encoded video frame includes the encoded block. The one or more syntax elements may be decoded, for example, from a frame header for the encoded video frame. The one or more syntax elements may have been encoded to the encoded bitstream to indicate whether an encoder used to encode the encoded block selected a distance-based predictions scheme or an averaging-based prediction scheme to predict motion for the encoded block before it was encoded.

At 704, a determination is made as to whether the encoded block was encoded by weighting distances from each of a plurality of reference frames to the encoded video frame. The determination can be made based on the value or values of the one or more syntax elements decoded from the bitstream including the encoded frame. For example, the decoded syntax elements may include one bit. When the bit has a first value (e.g., 0), it can be determined that the encoded block was encoded by weighting distances from each of a plurality of reference frames to the encoded video frame. However, when the bit has a second value (e.g., 1), it can be determined that the encoded block was not encoded by weighting distances from each of a plurality of reference frames to the encoded video frame.

At 706, responsive to determining that the encoded block was encoded by weighting the distances from each of the plurality of reference frames to the encoded video frame, a compound motion block is determined by weighting a first distance from a first reference frame to the encoded video frame and a second distance from a second reference frame to the encoded video frame using one or more quantized weighting coefficients. As described above, the first reference frame and the second reference frame may be past frames (e.g., frames that appear before the current video frame in a display order) or future frames (e.g., frames that appear after the current video frame in the display order).

The compound motion block can be determined at 706 in the same or a similar way as in the implementations for determining the first compound motion block described with respect to the technique 600. However, whereas an encoder performing the technique 600 receives information indicating the display order of the video sequence including the video frame, the first reference frame, and the second reference frame from an input video stream, a decoder performing the technique 700 does not receive that information from an input video stream.

Instead, an order of encoded video frames of the video sequence including the encoded video frame, the first reference frame, and the second reference frame can be indicated within the bitstream including the encoded video frame (and, for example, the previously-decoded one or more syntax elements). For example, the encoded bitstream may include data indicating frame indexes for each of the video frames encoded to the encoded bitstream. Those frame indexes may be used, either on their own or in connection with other data (e.g., packet stamp data, other temporal offset data, or the like), by a decoder performing the technique 700 to determine the display order for the video sequence.

Alternatively, at 708, responsive to determining that the encoded block was not encoded by weighting the distances using the one or more quantized weighting coefficients, a compound motion block is determined based on an average of pixel values of an encoded video block of the first reference frame and pixel values of an encoded video block of the second reference frame. The compound motion block can be determined at 708 in the same or a similar way as in the implementations for determining the second compound motion block described with respect to the technique 600.

At 710, a prediction block is generated using the compound motion block determined at 706 or at 708. As described above with respect to the technique 600, the prediction block can include pixel values indicating a prediction of the motion of the encoded block according to the determined compound motion block. Generating the prediction block can include generating a prediction residual based on a difference between the encoded block and the prediction block. For example, the prediction residual can be generated using operations performed by the decoder 500 shown in FIG. 5 (e.g., at the intra/inter prediction stage 508). At 712, the encoded block is decoded using the prediction block. For example, decoding the encoded block using the prediction block can include reconstructing the video block based on the prediction residual, filtering the reconstructed video block, and outputting the filtered video block to a video stream (e.g., the output video stream 516 shown in FIG. 5).

In some implementations, the technique 700 can include using more than two reference frames. For example, the technique 700 can use a same number of reference frames to decode the encoded block as an encoder used to encode the encoded block. Implementations for using more than two reference frames are described above with respect to the technique 600.

In some implementations, the technique 700 can include updating a probability model associated with the encoded video frame to indicate whether a compound motion block corresponding to a distance-based prediction scheme (e.g., the first compound motion block) or a compound motion block corresponding to an averaging-based prediction scheme (e.g., the second compound motion block) was selected for predicting motion of the encoded block. Implementations for updating a probability model are described above with respect to the technique 600.

Figure 8:
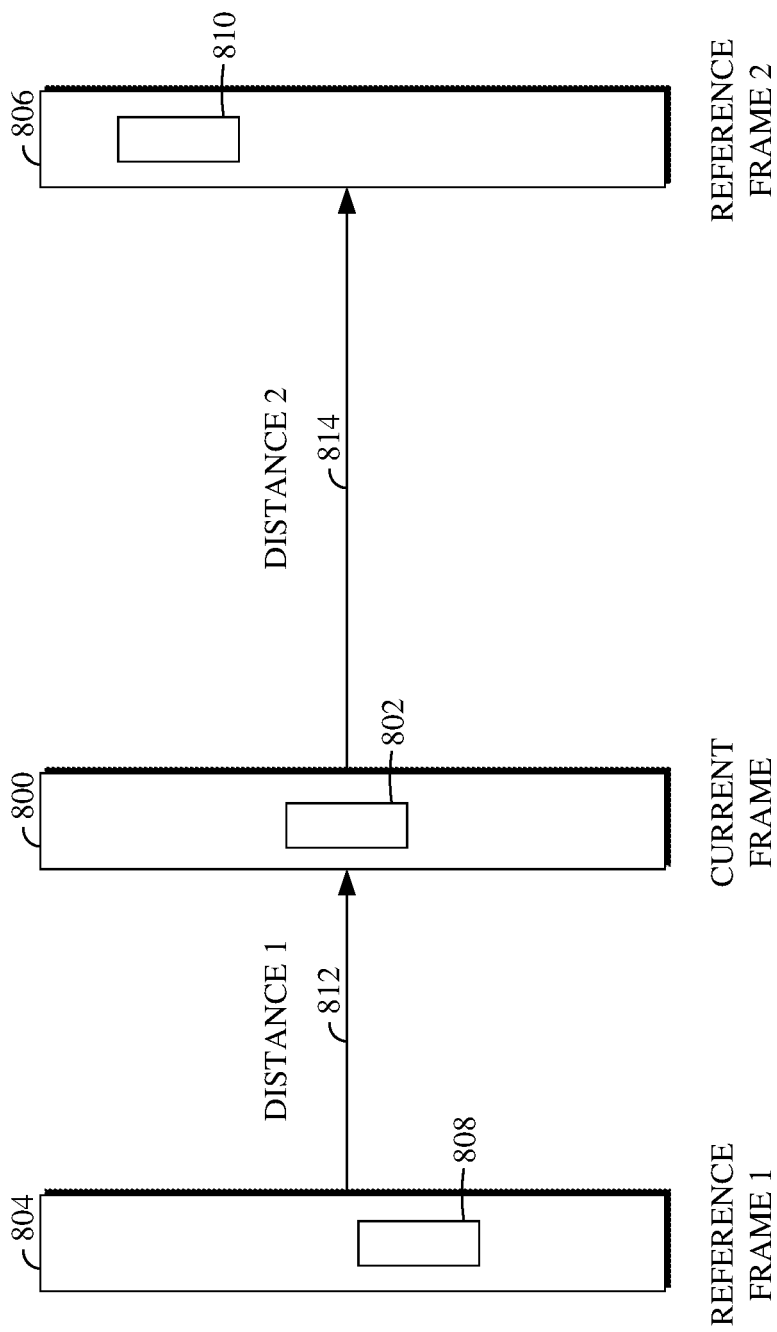
FIG. 8 is an illustration of an example of distances between frames of a video sequence.

FIG. 8 is an illustration of an example of distances between frames of a video sequence. A video frame 800 includes a video block 802 to be encoded or decoded. The video block 802 may be encoded or decoded using a first reference frame 804 and a second reference frame 806. For example, all or a portion of the pixel values of a video block 808 of the first reference frame may be combined with all or a portion of the pixel values of a video block 810 of the second reference frame. The combination of those pixel values may be based on the distance 1 812 indicating the distance in display order between the first reference frame 804 and the video frame 800 and based on the distance 2 814 indicating the distance in display order between the second reference frame 806 and the video frame 800.

In the event that the distance 1 812 and the distance 2 814 are equal, the pixel values of the video block 808 and the pixel values of the video block 810 may be equally combined to predict the motion in the video block 802. However, one of the distance 1 812 and the distance 2 814 may be greater than the other. In such a case, the more distant of the two reference frames 804, 806 from the video frame 800 likely has a diminishing impact on the overall prediction of the motion for the video block 802. In the example shown, the distance 2 814 is greater than the distance 1 812. As such, the respective pixel values of the video block 808 of the first reference frame should be given more weight than the respective pixel values of the video block 810 of the second reference frame when those pixel values are combined to predict the motion of the video block 802.

Figure 9:
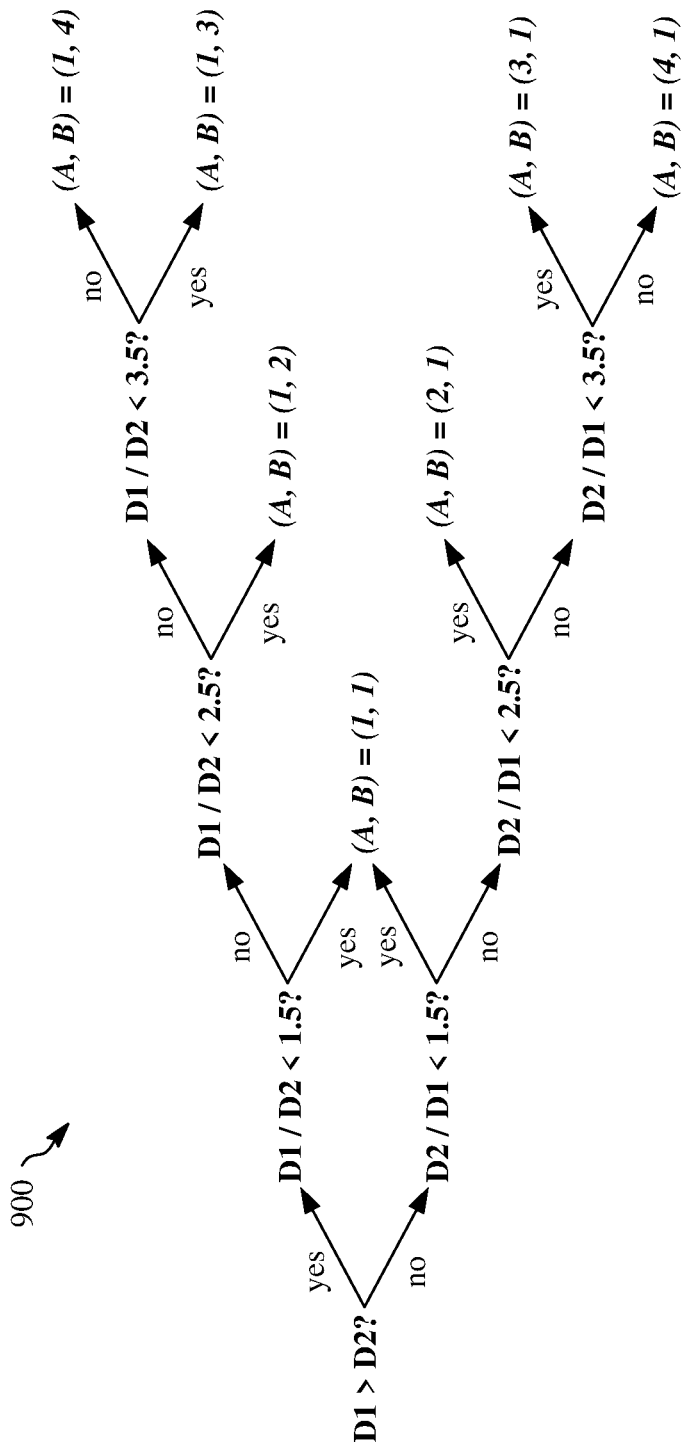
FIG. 9 is a diagram of an example of a tree for determining quantized weighted coefficients.

FIG. 9 is a diagram of an example of a tree 900 for determining quantized weighted coefficients. When using a distance-based prediction scheme for compound motion prediction as described in implementations of this disclosure, determining how to weight pixel values from each of the reference frames helps to conceal the quantization noise presented by each of those reference frames. To further reduce quantization noise, the weights applied to the pixel values from each of the reference frames are quantized coefficients. The quantized weighting coefficients applied against each of the groups of pixel values of the reference frames can be determined based on comparisons between the distances between each of those reference frames and the video frame including the video block to be encoded or decoded.

In the example shown, each leaf of the tree 900 includes either a comparison of a distance D1 (e.g., the distance 1 812 shown in FIG. 8) and a distance D2 (e.g., the distance 2 814 shown in FIG. 8) or a pair of quantized weighting coefficients for predicting the motion of the video block using pixel values from the first reference frame and the second reference frame. As described above, the compared values of D1 and D2 may, for example, be absolute values of D1 and D2.

At a first leaf, D1 and D2 are compared to determine which is larger. Based on that comparison, the tree 900 further compares ratios of D1 and D2 against different values to determine one of eight different possible pairs of quantized weighting coefficients, where each pair includes a first quantized weighting coefficient applied against pixel values of a video block of the first reference frame and a second quantized weighting coefficient applied against pixel values of a video block of the second reference frame.

For example, if D1 is greater than D2 and the ratio of D1 over D2 is less than 1.5, the first quantized weighting coefficient is 1 and the second quantized weighting coefficient is 1. If D1 is greater than D2 and the ratio of D1 over D2 is greater than or equal to 1.5 and less than 2.5, the first quantized weighting coefficient is 1 and the second quantized weighting coefficient is 2. If D1 is greater than D2 and the ratio of D1 over D2 is greater than or equal to 2.5 and less than 3.5, the first quantized weighting coefficient is 1 and the second quantized weighting coefficient is 3. However, if D1 is greater than D2 and the ratio of D1 over D2 is greater than or equal to 3.5, the first quantized weighting coefficient is 1 and the second quantized weighting coefficient is 4.

In another example, if D2 is greater than D1 and the ratio of D2 over D1 is less than 1.5, the first quantized weighting coefficient is 1 and the second quantized weighting coefficient is 1. If D2 is greater than D1 and the ratio of D2 over D1 is greater than or equal to 1.5 and less than 2.5, the first quantized weighting coefficient is 2 and the second quantized weighting coefficient is 1. If D2 is greater than D1 and the ratio of D2 over D1 is greater than or equal to 2.5 and less than 3.5, the first quantized weighting coefficient is 3 and the second quantized weighting coefficient is 1. However, if D2 is greater than D1 and the ratio of D2 over D1 is greater than or equal to 3.5, the first quantized weighting coefficient is 4 and the second quantized weighting coefficient is 1.

Accordingly, the values of the first quantized weighting coefficient and the second quantized weighting coefficient demonstrate a relationship between the first distance between the first reference frame and the current video frame and the second distance between the second reference frame and the current video frame. For example, if the ratio of the first distance and the second distance indicates that the first distance is twice as large as the second distance, the first quantized weighting coefficient will have a value of 2 and the second quantized weighting coefficient will have a value of 1. In another example, if the ratio of the first distance and the second distance indicates that the second distance is four or more times larger than the second distance, the first quantized weighting coefficient will have a value of 1 and the second quantized weighting coefficient will have a value of 4.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same embodiment or implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general purpose computer or general purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server, and the receiving station 106 can be implemented on a device separate from the server, such as a handheld communications device. In this instance, the transmitting station 102, using an encoder 400, can encode content into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device, and/or a device including an encoder 400 may also include a decoder 500.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described embodiments, implementations, and aspects have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. An apparatus for decoding an encoded block of an encoded video frame, the apparatus comprising:
 a memory; and
 a processor configured to execute instructions stored in the memory to:
  decode, from an encoded bitstream including the encoded video frame, one or more syntax elements indicating how to perform prediction for the encoded block; and
  determine whether the one or more syntax elements indicate to perform the prediction for the encoded block using a weighted distance approach;
  responsive to a determination that the one or more syntax elements indicate to perform the prediction for the encoded block using the weighted distance approach:
   apply a first weight to video data of a first reference frame that is a first distance from the encoded video frame to determine a first value;
   apply a second weight to video data of a second reference frame that is a second distance from the encoded video frame to determine a second value;
   form a first compound motion block based on the first weight and the second weight; and
   decode the encoded block using the first compound motion block; and
  responsive to a determination that the one or more syntax elements do not indicate to perform the prediction for the encoded block using the weighted distance approach:
   form a second compound motion block based on an average of the video data of the first reference frame and the video data of the second reference frame; and
   decode the encoded block using the second compound motion block.

2. The apparatus of claim 1, wherein an order of encoded video frames included in the encoded bitstream is indicated using packet stamps included in the encoded bitstream, the encoded video frames including the encoded video frame, the first reference frame, and the second reference frame.

3. The apparatus of claim 1, wherein, when the first distance is greater than the second distance, the first weight has a value of 1 and the second weight has a value of at least 1, and, when the first distance is less than the second distance, the first weight has a value of at least 1 and the second weight has a value of 1.

4. The apparatus of claim 1, wherein, when the first distance is greater than the second distance, a ratio of the first distance and the second distance is a first ratio of the first distance over the second distance, and, when the first distance is not greater than the second distance, the ratio of the first distance and the second distance is a second ratio of the second distance over the first distance,
 wherein, when the first ratio or the second ratio is less than 1.5, the first weight and the second weight are both equal to 1,
 wherein, when the first ratio is greater than 1.5 and less than 2.5, the first weight is 1 and the second weight is 2,
 wherein, when the first ratio is greater than 2.5 and less than 3.5, the first weight is 1 and the second weight is 3, wherein, when the first ratio is greater than 3.5, the first weight is 1 and the second weight is 4, wherein, when the second ratio is greater than 1.5 and less than 2.5, the first weight is 2 and the second weight is 1, wherein, when the second ratio is greater than 2.5 and less than 3.5, the first weight is 3 and the second weight is 1, and wherein, when the second ratio is greater than 3.5, the first weight is 4 and the second weight is 1.

5. The apparatus of claim 1, wherein the instructions include instructions to:

update a probability model to indicate whether the weighted distance approach is used to perform the prediction for the encoded block.

6. A method for decoding an encoded block of an encoded video frame, the method comprising:

comparing a first distance from a first reference frame to the encoded video frame against a second distance from a second reference frame to the encoded video frame to determine a ratio of the first distance and the second distance;

identifying a pair of quantized weighting coefficients based on the ratio of the first distance and the second distance;

forming a compound motion block using the pair of quantized weighting coefficients; and decoding the encoded block using the compound motion block.

7. The method of claim 6, wherein forming the compound motion block using the pair of quantized weighting coefficients comprises:

determining a first value by applying a first quantized weighting coefficient of the pair of quantized weighting coefficients to video data of the first reference frame;

determining a second value by applying a second quantized weighting coefficient of the pair of quantized weighting coefficients to video data of the second reference frame; and dividing a sum of the first value and the second value by a sum of the first quantized weighting coefficient and the second quantized weighting coefficient.

8. The method of claim 6, wherein the compound motion block is a first compound motion block, the method further comprising:

decoding, from an encoded bitstream including the encoded video frame, one or more syntax elements indicating how to perform prediction for the encoded block; and determining whether the one or more syntax elements indicate to perform the prediction for the encoded block using a weighted distance approach, wherein the first compound motion block is formed and used to decode the encoded block responsive to determining that the one or more syntax elements indicate to perform the prediction for the encoded block using the weighted distance approach; and responsive to determining that the one or more syntax elements do not indicate to perform the prediction for the encoded block using the weighted distance approach:

forming a second compound motion block based on an average of video data of the first reference frame and video data of the second reference frame; and decoding the encoded block using the second compound motion block.

9. The method of claim 6, wherein the pair of quantized weighting coefficients includes a first quantized weighting coefficient and a second quantized weighting coefficient, wherein, when the ratio indicates that the first distance is greater than the second distance, identifying the pair of quantized weighting coefficients based on the ratio of the first distance and the second distance comprises identifying the first quantized weighting coefficient as having a value of 1 and the second quantized weighting coefficient as having a value of at least 1, and wherein, when the ratio indicates that the first distance is less than the second distance, identifying the pair of quantized weighting coefficients based on the ratio of the first distance and the second distance comprises identifying the first quantized weighting coefficient as having a value of at least 1 and the second quantized weighting coefficient as having a value of 1.

10. The method of claim 6, wherein the pair of quantized weighting coefficients includes a first quantized weighting coefficient and a second quantized weighting coefficient, wherein, when the first distance is greater than the second distance, the ratio is a first ratio of the first distance over the second distance, and, when the first distance is not greater than the second distance, the ratio is a second ratio of the second distance over the first distance, wherein, when the first ratio or the second ratio is less than 1.5, the first quantized weighting coefficient and the second quantized weighting coefficient are both equal to 1, wherein, when the first ratio is greater than 1.5 and less than 2.5, the first quantized weighting coefficient is 1 and the second quantized weighting coefficient is 2, wherein, when the first ratio is greater than 2.5 and less than 3.5, the first quantized weighting coefficient is 1 and the second quantized weighting coefficient is 3, wherein, when the first ratio is greater than 3.5, the first quantized weighting coefficient is 1 and the second quantized weighting coefficient is 4, wherein, when the second ratio is greater than 1.5 and less than 2.5, the first quantized weighting coefficient is 2 and the second quantized weighting coefficient is 1, wherein, when the second ratio is greater than 2.5 and less than 3.5, the first quantized weighting coefficient is 3 and the second quantized weighting coefficient is 1, and wherein, when the second ratio is greater than 3.5, the first quantized weighting coefficient is 4 and the second quantized weighting coefficient is 1.

11. The method of claim 6, wherein the first distance and the second distance are determined based on an order of encoded video frames in an encoded bitstream, the encoded video frames including the encoded video frame, the first reference frame, and the second reference frame.

12. A method for decoding an encoded block of an encoded video frame, the method comprising:

forming a compound motion block based on a first value and a second value, the first value determined by applying a first weight to video data of a first reference frame, the second value determined by applying a second weight to video data of a second reference frame, the first weight determined based on a first distance from the first reference frame to the encoded video frame, the second weight determined based on a second distance from the second reference frame to the encoded video frame; and decoding the encoded block using the compound motion block.

13. The method of claim 12, further comprising:
decoding, from an encoded bitstream including the encoded video frame, one or more syntax elements indicating how to perform prediction for the encoded block; and
determining whether the one or more syntax elements indicate to perform the prediction for the encoded block using a weighted distance approach,
wherein the compound motion block is formed responsive to determining that the one or more syntax elements indicate to perform the prediction for the encoded block using the weighted distance approach.

14. The method of claim 13, wherein the compound motion block is a first compound motion block, the method further comprising:
responsive to determining that the one or more syntax elements do not indicate to perform the prediction for the encoded block using the weighted distance approach, forming a second compound motion block based on an average of the video data of the first reference frame and the video data of the second reference frame; and
decoding the encoded block using the second compound motion block.

15. The method of claim 12, wherein the compound motion block is formed by dividing a sum of the first value and the second value by a sum of the first weight and the second weight.

16. The method of claim 12, wherein the first distance and the second distance are determined based on an order of encoded video frames in an encoded bitstream, the encoded video frames including the encoded video frame, the first reference frame, and the second reference frame.

17. The method of claim 12, wherein values of the first weight and the second weight are based on a ratio of the first distance to the second distance.

18. The method of claim 17, wherein, when the first distance is greater than the second distance, the first weight has a value of 1 and the second weight has a value of at least 1, and, when the first distance is less than the second distance, the first weight has a value of at least 1 and the second weight has a value of 1.

19. The method of claim 17, wherein, when the first distance is greater than the second distance, the ratio is a first ratio of the first distance over the second distance, and, when the first distance is not greater than the second distance, the ratio is a second ratio of the second distance over the first distance.

20. The method of claim 19, wherein, when the first ratio or the second ratio is less than 1.5, the first weight and the second weight are both equal to 1,
wherein, when the first ratio is greater than 1.5 and less than 2.5, the first weight is 1 and the second weight is 2,
wherein, when the first ratio is greater than 2.5 and less than 3.5, the first weight is 1 and the second weight is 3,
wherein, when the first ratio is greater than 3.5, the first weight is 1 and the second weight is 4,
wherein, when the second ratio is greater than 1.5 and less than 2.5, the first weight is 2 and the second weight is 1,
wherein, when the second ratio is greater than 2.5 and less than 3.5, the first weight is 3 and the second weight is 1, and
wherein, when the second ratio is greater than 3.5, the first weight is 4 and the second weight is 1.

* * * * *